United States Patent [19]
Miyai et al.

[11] Patent Number: 5,583,882
[45] Date of Patent: Dec. 10, 1996

[54] LASER APPARATUS AND APPARATUS EMPLOYING LASER

[75] Inventors: Tsuyoshi Miyai; Satoshi Makio, both of Kumagaya; Yasunori Furukawa; Masayoshi Sato, both of Fukaya, all of Japan

[73] Assignee: Hitachi Metals, Ltd., Tokyo, Japan

[21] Appl. No.: 395,567

[22] Filed: Mar. 1, 1995

[30] Foreign Application Priority Data

May 16, 1994 [JP] Japan ................................ 6-100394
Sep. 21, 1994 [JP] Japan ................................ 6-226751

[51] Int. Cl.$^6$ ................................................ H01S 3/08
[52] U.S. Cl. ..................... 372/103; 372/21; 372/22; 372/34; 372/98; 372/41; 372/20
[58] Field of Search .......................... 372/40, 41, 69, 372/66, 70, 18, 34, 36, 22, 98, 99, 20, 39

[56] References Cited

U.S. PATENT DOCUMENTS

| | | | |
|---|---|---|---|
| 5,105,434 | 4/1992 | Krupke et al. | 372/41 |
| 5,218,610 | 6/1993 | Dixon . | |
| 5,249,189 | 9/1993 | Scheps | 372/70 |
| 5,267,252 | 11/1993 | Amano | 372/34 |
| 5,272,715 | 12/1993 | Guerin | 372/98 |
| 5,287,373 | 2/1994 | Rapoport et al. | 372/69 |
| 5,341,388 | 8/1994 | Masuda et al. | 372/34 |
| 5,383,209 | 1/1995 | Hwang | 372/22 |
| 5,430,754 | 7/1995 | Suzuki et al. | 372/22 |

FOREIGN PATENT DOCUMENTS

| | | |
|---|---|---|
| 0557182 | 8/1993 | European Pat. Off. . |
| WO93/22810 | 11/1993 | WIPO . |

OTHER PUBLICATIONS

Balembois et al., Tunable Blue Light Source by Intracavity Doubling of a Cr–doped LiSrAlf$_6$ Laser, Nov. 16, 1992, vol. 61, No. 20, pp. 2381–2382, Applied Physics Letters.

Taira et al., Q–Switching and Frequency Doubling of Sol–id–State Lasers by a Single Intracavity KTP Crystal, Mar. 30, 1994, No. 3, pp. 800–804, IEEE Journal of Quantum Engineering.

Scheps et al., Diode–pumped Cr:LiSrAlF$_6$ laser, 1/24/91, Optics Letters, vol. 16 No. 11, pp. 820–822.

Zhang et al., Electronically tuned diode–laser–pumped Cr:LiSrAlF$_6$, pp. 43–45.

*Primary Examiner*—Leon Scott, Jr.
*Attorney, Agent, or Firm*—Staas & Halsey

[57] ABSTRACT

A laser apparatus including a laser crystal composed of a fluoride which contains chromium (Cr), a resonator which includes the laser crystal, a means for exciting the laser crystal, a first laser beam produced from light which is emitted from the laser crystal and oscillated in the laser resonator, and at least one optical component which is inserted in said resonator; wherein an aperture in the resonator is substantially five or more times the diameter of the first laser beam. A small, low-power SHG laser light source is achieved.

19 Claims, 7 Drawing Sheets

ELECTRONIC COOLING ELEMENT

FIG. 3

ELECTRONIC COOLING ELEMENT

LASER APPARATUS AND APPARATUS EMPLOYING LASER

BACKGROUND OF THE INVENTION

1. Field of the Invention

The present invention relates to a laser apparatus which is employed in the optoelectronics field and, more particularly, to a laser apparatus employed for a laser printer, particle counter, optical inspection apparatus for medical use, photofabrication apparatus, and optical disk apparatus.

2. Description of the Related Art

With the growing advanced information age, there has been increasing demand for shorter wavelength in computer peripheral apparatuses incorporating laser such as an optical disk apparatus and laser printer in order to meet the needs for higher recording density and higher printing speed. There are currently available, however, only gas laser apparatuses including a helium-cadmium (He-Cd) laser apparatus and argon (Ar) laser apparatus as light sources capable of providing satisfactory blue radiation for which there is high demand at the commercialization level. These gas lasers are large and heavily consume electric power. Since the laser apparatuses are large, laser-applied apparatuses, which incorporate laser apparatuses as light sources thereof, must be at least as large as the laser apparatuses. Thus the apparatuses employing lasers unavoidably become large, presenting a problem in that they are hardly suited for use in office environment or residential environment where desk-top size is dominant.

Further, such laser apparatuses have low efficiency of conversion from supplied power into laser output power; the majority of the power consumed turns into heat, leading to the need of a cooling means. This adds to the size of an apparatus incorporating a laser. There is another problem: an optical system is dislocated by vibration of the cooling means, deteriorating the reliability of the laser-applied apparatus. There is still another problem: the service life of such a laser apparatus is short mainly due to the deterioration in charged gas, resulting in a shortened life of the laser-applied apparatus.

An attempt has been made to solve the problems involved in the gas lasers stated above by applying a wavelength converting art typically represented by the second harmonic generation (hereinafter referred to simply as "SHG") in which a nonlinear optical crystal is inserted in a resonator of a solid-state laser so as to accomplish conversion into a wavelength which is half the wavelength of the first laser beam (hereinafter referred to as "fundamental wave" as necessary) which is the oscillation wave of the solid-state laser. For example, the SHG system for solid-state laser has been proposed which employs Ti:Al$_2$O$_3$ (Ti-Sap;Ti-Sapphire) or Cr:LiSrAlF$_6$ (chromium doped lithium strontium aluminum fluoride: hereinafter sometimes referred to simply as "LiSAF") which is a laser crystal capable of oscillating over a wavelength range of, for example, 800 to 900 nm. The use of such solid-state crystals instead of gases has led to a dramatically prolonged service life of laser medium unit. The pumping source of the LiSAF laser, however, is still a krypton (Kr) laser, i.e. a gas laser; therefore, the LiSAF laser still has the problems unsolved. ("Tunable blue light source by intracavity frequency doubling of a Cr-doped LiSrAlF$_6$ laser", Appl. Phys. Lett., vol. 61, No. 20, p 2381 (1992) by F. Balembois, P. Georges, F. Salin, G. Roger, and A. Brun) Furthermore, the Ti-Sap laser employs, as its pumping source, a green SHG laser having a Q switch Nd:YAG (neodymium doped yttrium aluminum garnet) laser for its fundamental wave. The use of the solid-state design for the whole laser light source has achieved a prolonged service life; however, the problems stated above have not been considerably improved because the completed apparatus incorporates two SHG lasers including the pumping source, resulting in a complicated design, large size, and heavy power consumption. In either case, SHG outputs are in the form of pulses, posing problems such as one wherein signal discontinuity takes place in a laser-applied apparatus including a laser printer, photofabrication apparatus, and optical disk apparatus.

It has been disclosed that a red semiconductor laser having a wavelength of 670 nm can be used as the pumping source of the aforesaid LiSAF ("Diode-pumped Cr:LiSrAlF$_6$ laser", Opt. Lett., Vol. 16, No. 11, p820 (1991) by R. Scheps, J. F. Myers, H. B. Serreze, A. Rosenberg, R. C. Morris, and M. Long). Thus, it is expected that there is a possibility of significantly improving the problems of the large size, heavy power consumption, and short service life of the conventional gas laser apparatus by replacing the Kr laser with a semiconductor laser for the pumping source of the SHG light source which employs the foregoing LiSAF laser for the fundamental wave.

It has been disclosed, however, that the LiSAF laser exhibits a markedly low efficiency due to the loss in the resonator ("Electronically tuned diode-laser-pumped Cr:LiSrAlF$_6$ laser", Opt. Lett., Vol. 17, No. 1, p43 (1992) by Qi Zhang, G. J. Dixon, B. H. Chai and P. N. Kean). This means that the feasibility of practical utilization stays extremely low unless the cause of the low efficiency is identified and examined to find a specific solution.

Qi Zhang et al. took out a birefringent filter, which is a wavelength tuning element for enabling the LiSAF laser to select wavelength, from the resonator of the LiSAF laser. In general, the birefringent filter, which is provided in a resonator of a laser such as the LiSAF laser capable of wavelength tuning, is designed to give the loss typically represented by reflection loss to oscillation beams other than the oscillation beams having a desirable wavelength, thereby selecting laser beams of the desirable wavelength. Qi Zhang et al. added a resonator exclusively designed for wavelength tuning which includes the birefringent filter to the rear stage of the resonator of the LiSAF laser. More specifically, Qi Zhang et al. has proposed a means for feeding back the return beams of the desired wavelength to the resonator of the LiSAF laser and amplifying them so as to perform wavelength tuning without the loss caused by the resonator of the LiSAF laser (U.S. Pat. No. 5,218,610). The loss on which Qi Zhang et al. focused their attention was primarily the reflection loss caused by the birefringent filter. The method had a possibility of an apparatus equipped with the means becoming complicated and large although it was capable of reducing the loss.

Further, there is an example wherein a corrective measure has been taken with attention given to the fact that the uneven energy absorption of the LiSAF crystal, which is a laser crystal, adversely affects the efficiency of laser oscillation. The example shows an attempt to improve the efficiency by distributing Cr involved in the absorption in different concentrations in the exciting direction (U.S. Pat. No. 5,287,373). This method, however, has not yet been realized at a commercial level and it does not clearly indicate improvement in the problems identified by Qi Zhang et al.

In the optical system disclosed by F. Balembois et al. mentioned above, a Kr laser is used as the pumping source and pulse excitation of 3.3 W on the average is carried out to provide a pulse SHG laser output of 7.4 mW on the average. As stated above, the SHG laser output must be continuous waves. The required output is considered to be about 10 mW although it varies from one apparatus to another. A single-stripe type semiconductor laser which is capable of exciting the LiSAF laser and which is currently commercially available is of max. 500 mW class. The fundamental wave power is generally proportional to the exciting power in the input/output characteristic of a solid-state laser; therefore, the fundamental wave power is reduced approximately to one sixth when the pumping source is changed from the Kr laser to a semiconductor laser. In addition, the SHG output is proportional to the square of the fundamental wave power and therefore the expected SHG output will be about one thirty-sixth, i.e. a 0.2 mW pulse output. This indicates that no SHG output which is high enough for practical utilization will be accomplished unless the efficiency is improved greatly. Furthermore, the shape, i.e. the transverse mode of the output beam of a semiconductor laser is markedly flat in comparison with the Kr laser; therefore, it is anticipated that even if a beam shaping art is applied, the deterioration in the exciting efficiency cannot be prevented, with a resultant further reduction in the SHG output.

Hence, it is easily predicted that simply by changing the pumping source from the Kr laser to a semiconductor laser will not be able to achieve an SHG laser light source capable of providing output which is high enough for practical use. In addition, there is a concern in that even if higher output of the semiconductor laser is attained, the heat generated will increase and a forced-cooling means will be required, resulting in a large apparatus which heavily consumes electric power.

Thus, it has been found difficult to achieve an SHG laser, which employs the LiSAF laser excited by a semiconductor laser for solving all the problems involved in a gas laser, simply by combining the arts which have been disclosed. It is considered necessary, therefore, to achieve a small, low-electric power consumption SHG laser light source by identifying a cause of low efficiency and taking specific corrective measures and also to accomplish a laser-applied apparatus which employs the SHG laser light source.

SUMMARY OF THE INVENTION

Accordingly, it is an object of the present invention to solve the shortcomings described above.

It is another object of the present invention to achieve a small, low-electric power consumption SHG laser light source and a laser-applied apparatus which employs such SHG laser light source.

It is still another object of the present invention to greatly improve the efficiency of LiSAF laser excited by semiconductor laser by designing the resonator for the LiSAF laser with careful consideration given to an aperture in the resonator.

It is yet another object of the present invention to propose a means for controlling the temperature of LiSAF crystal so as to avoid the decay of the oscillation of the laser, thereby providing stable laser output.

It is a further object of the present invention to achieve a 10 mW-class output SHG laser by employing the aforesaid LiSAF laser.

It is a still further object of the present invention to provide a laser apparatus which is equipped with a laser crystal made of a fluoride, which contains chromium (Cr), a resonator which includes the laser crystal, a means for exciting the laser crystal, a first laser beam produced from the light emitted from the laser crystal and oscillated in the laser resonator, and at least one optical component which is inserted in the resonator, the aperture in the resonator being substantially five or more times the diameter of the first laser beam.

DETAILED DESCRIPTION OF THE PREFERRED EMBODIMENTS

A preferred embodiment of the present invention will now be described with conjunction with the accompanying drawings.

The inventors studied the loss in a resonator and found that the loss has something to do with the size of an aperture of an optical component in a resonator. The aperture specifically means the effective cross-sectional area of an optical surface of an optical component in a resonator. It has been regarded that there should be no problem in a regular laser apparatus as long as an aperture of an optical component is larger than the diameter of laser beam. The inventors have found, however, that the loss is observed even when such an aperture of an optical component has a size which has conventionally believed appropriate in the LiSAF laser which is a new type of laser. Based on the founding, the inventors have devised the present invention. According to the present invention, there is provided a laser apparatus which is equipped with a laser crystal containing a fluoride, a resonator which includes the laser crystal, a means for exciting the laser crystal, a first laser beam produced from the light emitted from the laser crystal and oscillated in the laser resonator, and an optical component which is inserted in the resonator, wherein the aperture in the resonator is substantially five or more times the diameter of the first laser beam.

Figure 7:
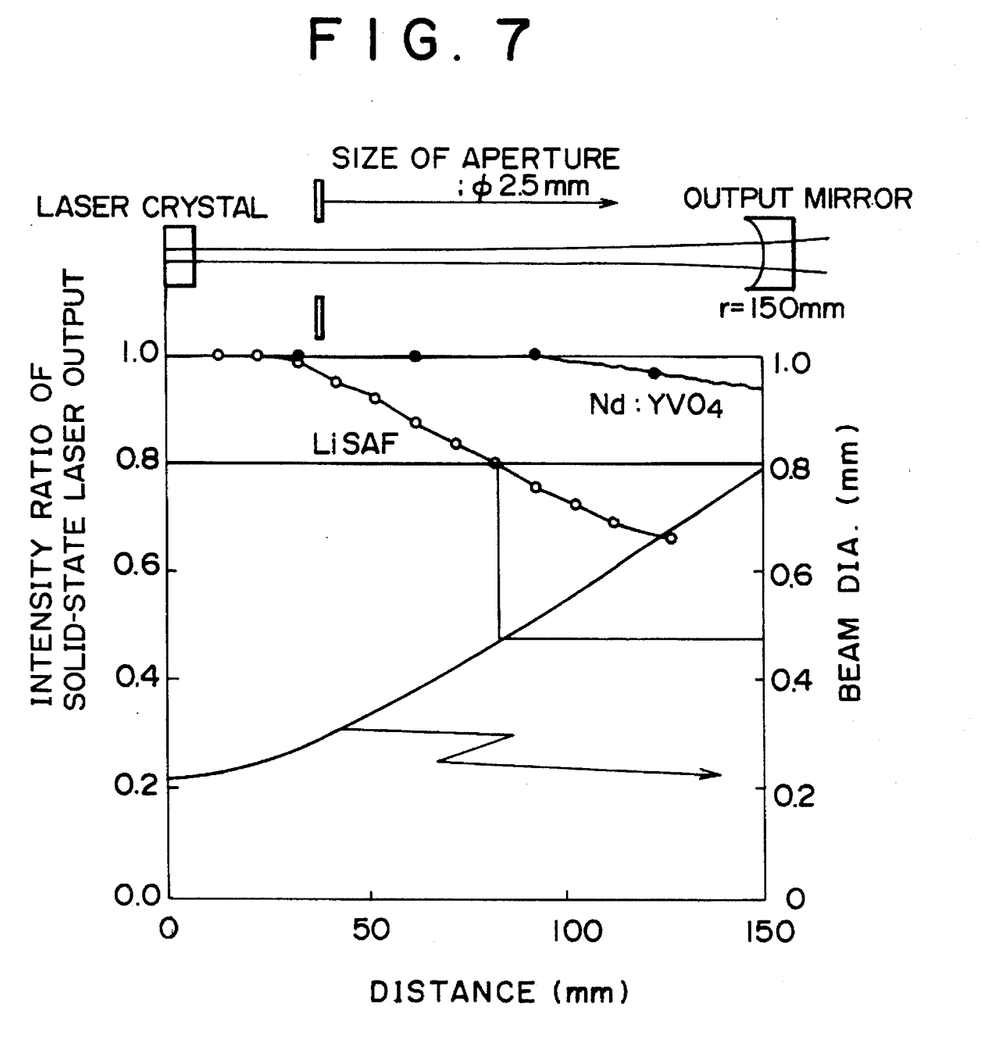
FIG. 7 is a diagram illustrative of the deterioration of the oscillation efficiency which is attributable to the apertures in the resonators of Nd:YVO$_4$ laser and LiSAF laser which are representative solid-state lasers.

FIG. 7 is a diagram illustrative of the deterioration in the oscillation efficiency which is attributable to the apertures in the resonators of Nd:YVO$_4$ (neodium doped yttrium vanadium oxide) laser which is a representative solid-state laser and the LiSAF laser. The shape of the resonator used for the experiment is shown at the top in FIG. 7. The resonator is constituted by a mirror formed on the end surface of the laser crystal and a concave mirror. The diameter of the oscillation beam is determined by the radii of curvatures and distances of the mirrors constituting the resonator. In the case of the plano-concave resonator shown at the top in FIG. 7, the beam diameter reaches the minimum value on the flat surface side and it reaches the maximum value at the concave mirror. The then radius of curvature of the concave mirror is 150 mm; the effective length of the optical path between the mirrors of the resonator is slightly smaller than the radii of curvatures of the mirrors. In FIG. 7, the axis of abscissa indicates the distance from the flat mirror; the axis of ordinate on the right indicates the beam diameter. In the case of a truly round beam, the transversal mode of which is TEM$_{00}$ mode, the beam diameter in the resonator can be computed from the minimum beam diameter determined by Expression 1 and the beam diameter at each point determined by Expression 2 shown below.

$$w_0 = \left[ \left( \frac{\lambda}{\pi} \right)^2 \frac{d(R_1-d)(R_2-d)(R_1+R_2-d)}{(R_1+R_2-2d)^2} \right]^{\frac{1}{4}}$$ Expression 1

$$w(z) = \left[ w_0^2 \left[ 1 + \left( \frac{\lambda z}{\pi w_0^2} \right)^2 \right] \right]^{\frac{1}{2}}$$ Expression 2

In Expression 1, $w_0$ denotes the minimum beam diameter, $\lambda$ denotes the wavelength of the first beam, d denotes the length of the resonator, and $R_1$ and $R_2$ denote the radii of curvatures of the mirrors. In Expression 2, w(z) denotes the beam diameter at a point which is z (distance) away from the point at which the beam diameter is the minimum. The beam diameters determined by the calculation were a minimum of about 0.2 mm and a maximum of about 0.8 mm. The actual measurements of the beam diameters measured immediately out of the output mirror proved to be almost the same in each case and they closely agree with calculation results. An aperture having a diameter of 2.5 mm was inserted in the resonator and adjustment was made so that the maximum intensity of oscillation beam is provided, then the intensity of the oscillation beam was measured. The axis of ordinate on the left indicates the ratio of the intensity of the oscillation beam obtained with the aperture inserted against the intensity obtained without the aperture inserted. It has been found that the Nd:YVO$_4$ laser is capable of oscillating at efficiency of 90% or more even when the aperture in the resonator becomes three times the beam diameter, i.e. when the beam diameter becomes the maximum value, 0.8 mm. It has been also found that the efficiency is reduced to approximately 80% in the LiSAF laser when the aperture in the resonator is five or less times the beam diameter. It was seen also that the efficiency declines more steeply in the LiSAF laser than in the Nd:YVO$_4$ laser. It is desirable that the aperture is seven times or more of the beam diameter in order to secure the same efficiency, namely, 90% or more, as that in the Nd:YVO$_4$. Further, an aperture which is ten times or more of the beam diameter is considered more desirable because no drop in the efficiency is observed with the aperture of that size. If the light intensity exhibits Gaussian distribution when the transversal mode is the truly round TEM$_{00}$ mode, then the beam diameter is generally defined by a value within a range of 1/e$^2$ or more of peak intensity. If the transverse mode of the beam is other than TEM$_{00}$, then the beam diameter is defined as the maximum length of outermost circumference of a boundary from which the light intensity becomes 1/e$^2$ or less of the peak. The above description refers to the definition related to the lower limit of the aperture. The upper limit of the aperture is defined by the maximum growable size of crystal and the size of the crystal at which stable processing can be accomplished and the coating quality can be ensured. The upper limit of about 1000 times is normally considered desirable.

The inventors then discovered that the input/output characteristics of the LiSAF laser exhibit saturation.

Figure 8:
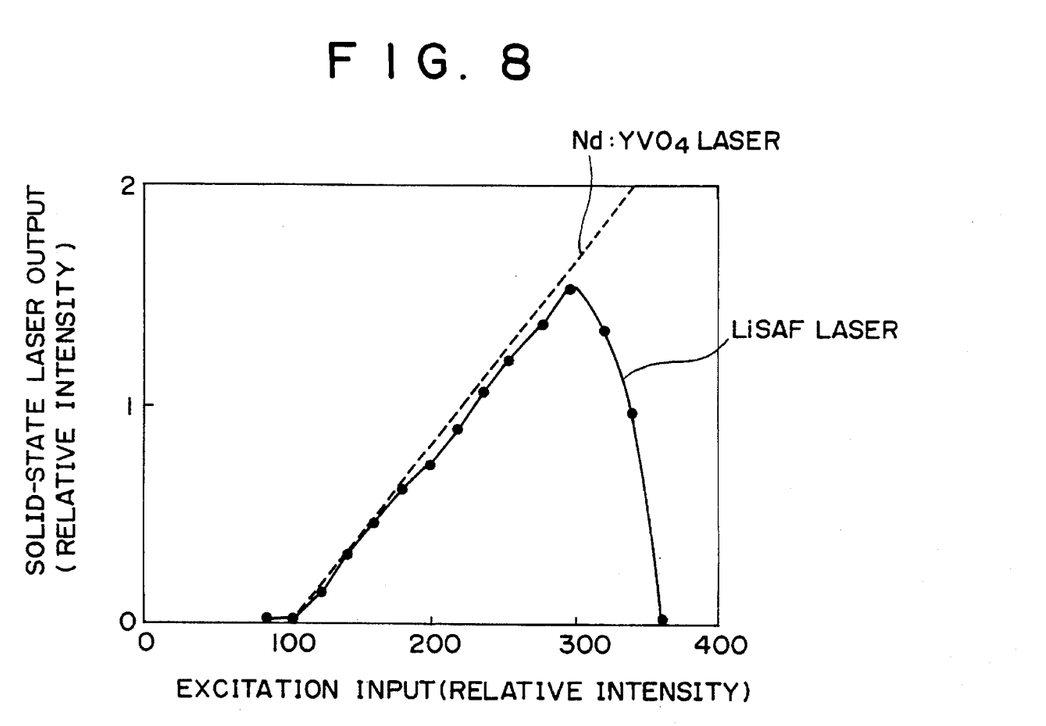
FIG. 8 is a diagram illustrative of the comparison in the input/output characteristics between a solid-state laser apparatus excited by a semiconductor laser which employs LiSAF crystal and Nd:YVO$_4$ which is a representative solid-state laser.

FIG. 8 shows the comparison in the input/output characteristics between the LiSAF laser and the Nd:YVO$_4$ laser which is a representative solid-state laser. The solid line indicates the input/output characteristics of the LiSAF laser; the dotted line indicates the input/output characteristic of a general solid-state laser apparatus. In the Nd:YVO$_4$ laser, the input/output characteristic curve shown by the dotted line rises at a certain input value, then displays a nearly proportional relationship between the excitation input and the solid-state laser output. In the LiSAF laser, as shown by the solid line, the output characteristic exhibits saturation beyond the linear zone and even when the excitation input increases, the output continues to decline until the oscillation finally decays, indicating that no stable solid-state laser output can be obtained. The inventors devoted themselves to the investigation of the problem and found that the problem of the saturation and the decay of oscillation observed in the input/output characteristics of the LiSAF laser shown in FIG. 8 can be solved by controlling the temperature of the laser crystal which employs LiSAF crystal. Based on the finding, the inventors have devised the present invention.

Figure 9:
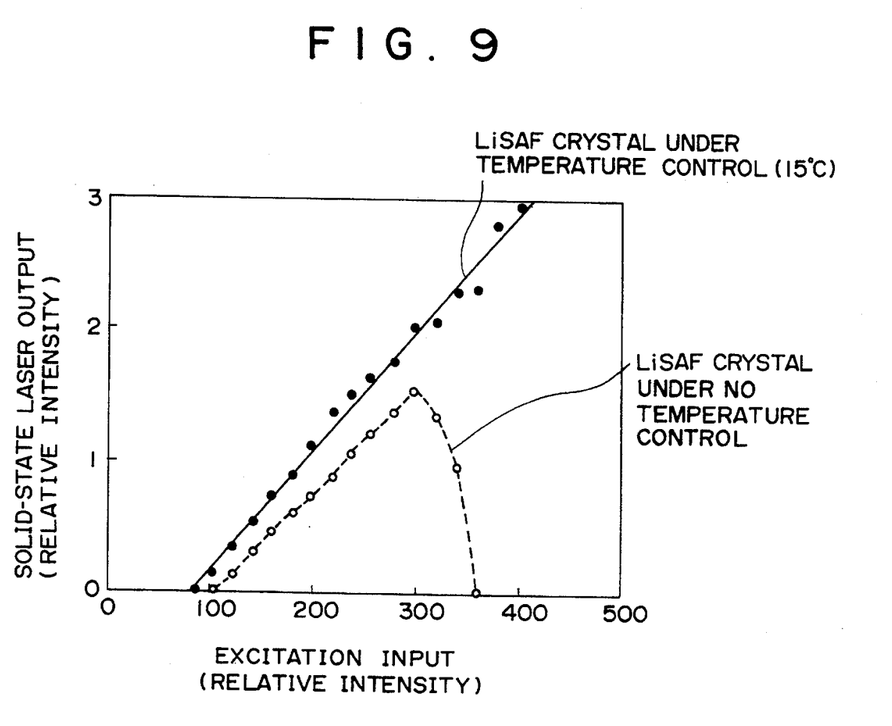
FIG. 9 is a diagram illustrative of the comparison in the input/output characteristics of the LiSAF laser between a case where the LiSAF crystal is placed under temperature control and a case where it is not placed under temperature control.

FIG. 9 is a diagram illustrative of the comparison in the input/output characteristics of the LiSAF laser between the case where the LiSAF crystal is placed under temperature control and the case where it is not placed under temperature control. The solid line indicates the input/output characteristics observed when the temperature of the LiSAF crystal is controlled to 15°±5° C.; the dotted line indicates the input/output characteristics observed when no temperature control is carried out. From FIG. 9, it can be seen that the linear zone can be expanded by controlling the temperature of the laser crystal to provide stable solid-state laser. FIG. 9 shows the input/output characteristics observed when the temperature of the LiSAF crystal is controlled to 15° C. Measurements were also made on the input/output characteristics obtained when the temperature of the crystal is controlled to 10° C., 20° C., 30° C., and 40° C., respectively; at every temperature, the linear zone in the input/output characteristics proved to have been expanded and stable solid-state laser output was obtained. The lower limit of the temperature control range is the temperature at which the laser crystal does not develop dewing under operating condition. The upper limit of the temperature control range is the temperature at which the aforesaid decay of oscillation is not observed under operating condition. Temperature T of the laser crystal should be controlled to the range of 0≦T≦50° C.

Further, at least one of a plurality of mirrors constituting the resonator should be formed on one end surface of the laser crystal.

Furthermore, at least one of the optical components should be a wavelength tuning element.

Preferably, the laser apparatus has a laser crystal made of Cr:LiSrAlF$_6$, a resonator structure which includes at least one resonator mirror formed on one end surface of the laser crystal, a semiconductor laser for exciting the laser crystal, a first laser beam which is produced from the light emitted from the laser crystal and oscillated in the laser resonator, wavelength $\lambda_1$ thereof being $780 \leq \lambda_1 \leq 1000$ nm, and an aperture which is five or more times the diameter of the first laser beam, the aperture being inserted in the resonator.

Further the laser apparatus should be equipped with a laser crystal made of Cr:LiSrAlF$_6$, a resonator structure which includes at least one resonator mirror formed on one end surface of the laser crystal, a semiconductor laser for exciting the laser crystal, a means for controlling temperature T of the laser crystal to the range of $0 \leq T \leq 50°$ C., a first laser beam which is produced from the light emitted from the laser crystal and oscillated in the laser resonator, wherein wavelength $\lambda_1$ thereof is $780 \leq \lambda_1 \leq 1000$ nm, and a wavelength tuning element which has an aperture measuring five or more times the diameter of the first laser beam and which is inserted in the resonator.

Further, the optical component should include a wavelength tuning element and a nonlinear optical crystal.

Furthermore, the laser apparatus should be equipped with a laser crystal made of Cr:LiSrAlF$_6$, a resonator structure which includes at least one resonator mirror formed on one end surface of the laser crystal, a semiconductor laser for exciting the laser crystal, a first laser beam which is produced from the light emitted from the laser crystal and oscillated in the laser resonator, wavelength $\lambda_1$ thereof being $780 \leq \lambda_1 \leq 1000$ nm, a nonlinear optical crystal which has an aperture of five or more times as large as the diameter of the first laser beam and which is inserted in the resonator, a wavelength tuning element, a means for controlling the temperatures of the nonlinear optical crystal and the laser crystal and the nonlinear optical crystal at the same time or independently, and a means for taking out a second laser beam which is obtained by converting a part of the first laser beam into a beams with a different wavelength.

In addition, the nonlinear optical crystal is preferably one of lithium triborate (LiB$_3$O$_5$), barium borate ($\beta$-BaB$_2$O$_4$), potassium niobate (KNbO$_3$), lithium-potassium niobate (K-Li-Nb-O), and lithium folate (LiIO$_3$).

Using the laser apparatus according to the present invention for a laser printer, particle counter, optical inspection for medical use photofabrication apparatus, optical disk apparatus, etc. makes it possible to provide a small apparatus featuring high stability.

[EXAMPLE 1]

Figure 1:
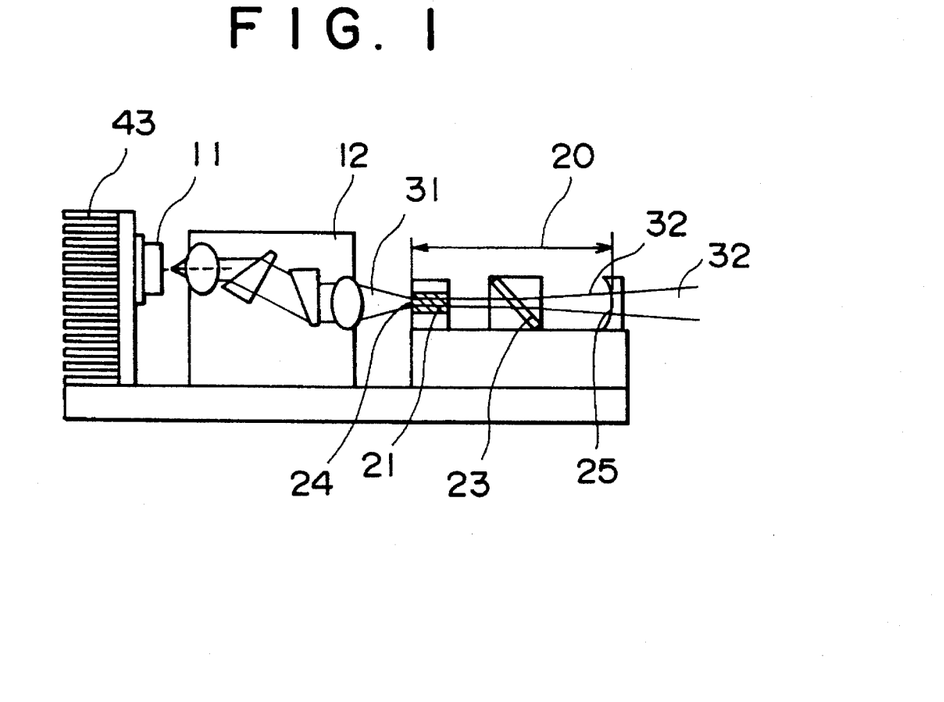
FIG. 1 is a diagram illustrative of an embodiment of the present invention.

FIG. 1 is the diagram illustrative of an embodiment of the present invention. A pumping beam 31 emitted from a semiconductor laser 11 is condensed through a condenser optical system 12 to excite a laser crystal 21. The semiconductor laser 11, which employs an AlGaInP semiconductor laser manufactured by Spectra Diode Lab. (SDL), has output of 500 mW and oscillation wavelength of 670 nm. The condenser optical system 12 used a semiconductor laser collimator (focal length: 8 mm), anamorphic prism pairs (×6), and a focusing lens (focal length: 30 mm).

The excited laser crystal 21 oscillates a first laser beam 32 through a solid-state laser resonator 20 which is constituted by a resonator mirror 24 on the incident side which is formed on an end surface of the laser crystal and an output mirror 25. Disposed in the solid-state laser resonator 20 are the laser crystal 21 and a wavelength tuning element 23. The wavelength of the first laser beam 32 oscillated in the resonator is tuned by a wavelength tuning element 23. The resonator 20 is a plano-concave resonator, the radius of curvature of the output mirror 25 being 150 mm and the effective optical path length being made slightly smaller than the radius of curvature.

For the laser crystal 21, a LiSAF crystal ($\phi$3×5 mm) with 1.5 mol % of Cr doped. Front end surface 24 of the crystal was provided with anti-reflection (hereinafter referred to simply as "AR") coating, the reflectivity of which is 2% or less with respect to excitation wavelength, or high-reflection (hereinafter referred to simply as "HR") coating, the reflectivity of which is 99% or more with respect to the wavelength of the first laser beam. In this case, the reflectivity of the HR coating needs not be 99% or more as long as it enables the first laser beam to be confined efficiently. Rear end surface was provided with the AR coating which exhibits 2% of reflectivity or less with respect to the wavelength of the first laser beam. The output mirror 25 was provided with the HR coating of 99% of reflectivity or more with respect to the first laser beam. The reflectance of the output mirror 25 needs not be 99% or more as long as it enables first laser beam to be taken out with high efficiency.

In this resonator, the diameter profile of the first laser beam was same as shown in FIG. 7. The beam diameters determined by the calculation were a minimum of about 0.2 mm and a maximum of about 0.8 mm. The actual measurements of the beam diameters measured immediately out of the output mirror agreed with the calculation results.

In the present invention, it has been proven that the aperture of the resonator less than 5 times of beam diameter reduced more than 20% of the intensity of oscillated laser power. Based on the finding, the diameter of the laser crystal 21 was set to 3 mm so that it may 5 times larger than 0.2–0.25 mm of beam diameter. The diameter of the aperture in the wavelength tuning element 23 was set to 5 mm so that it may also 5 times larger than 0.5 mm of beam diameter. The diameter of the aperture in the output mirror was set to 10 mm so that it may also 5 times larger than 0.8 mm of beam diameter.

A birefringent filter was used for the wavelength tuning element 23 which was disposed so that it was set at Brewster angle with respect to the first laser beam 32. The first laser beam 32 can be tuned in wavelength by turning the birefringent filter around beam axis, the wavelength tuning range being set to approximately 860±50 nm. The wavelength selecting width may be set at any value as long as it does not cause a marked drop in the output of the first laser beam. For the wavelength tuning element, a prism, etalon, injection locking from outside, or a combination of these may be used instead of the birefringent filter.

Further, in this embodiment, the allowable wavelength width for the absorption of the LiSAF crystal 21 was approximately 100 nm large and no wavelength tuning for the pumping semiconductor laser was carried out using a temperature control element. Such tuning, however, may be carried out for accomplishing agreement with maximum absorption wavelength.

In addition, as an alternative of the condenser optical system for the semiconductor laser, an optical component such as a cylindrical lens and optical fiber, which has a beam shaping function, may be used.

[EXAMPLE 2]

Figure 2:
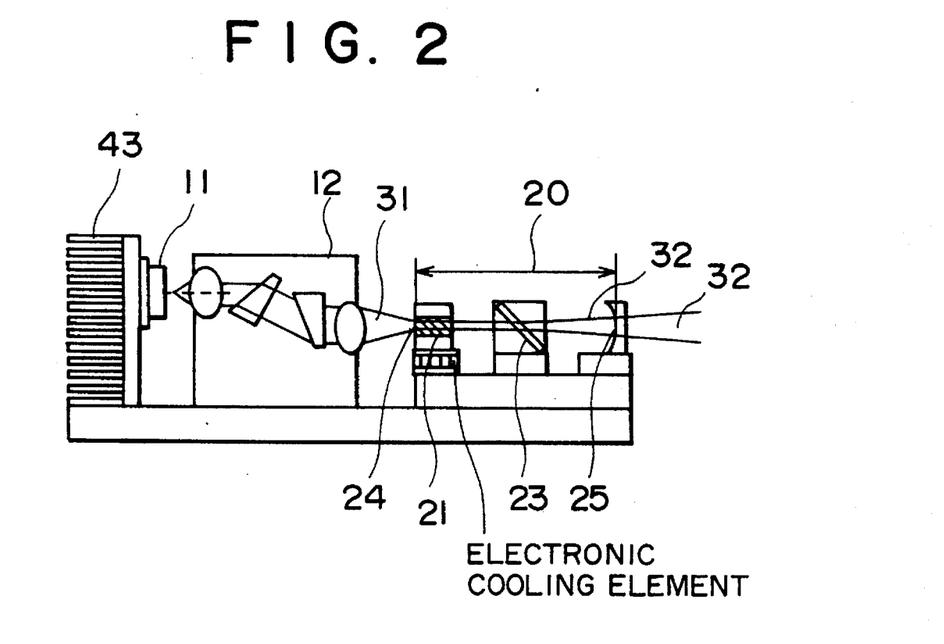
FIG. 2 is a diagram illustrative of another embodiment wherein laser crystal temperature control is applied, which is a means for improving efficiency in accordance with the present invention.

FIG. 2 is the diagram illustrative of another embodiment wherein laser crystal temperature control is applied, which is another means for improving efficiency in accordance with the present invention. The pumping source 11, the condenser optical system 12, the laser crystal 21, the wavelength tuning element 23, the resonator 20, and beam diameter are the same as those of the example 1. The aperture in the resonator, the wavelength tuning range, etc. are also identical to those of the example 1.

As it is seen from FIG. 9, it has been found that stable laser output can be achieved by controlling the temperature of the LiSAF crystal. In FIG. 2, the temperature of the LiSAF crystal was controlled at 15° C. by using an electronic cooling element and a thermistor. The control temperature may be set at any value within a range wherein the laser output is not saturated under operating condition, with the temperature at which the laser crystal begins to form dew being the lower limit.

[EXAMPLE 3]

Figure 3:
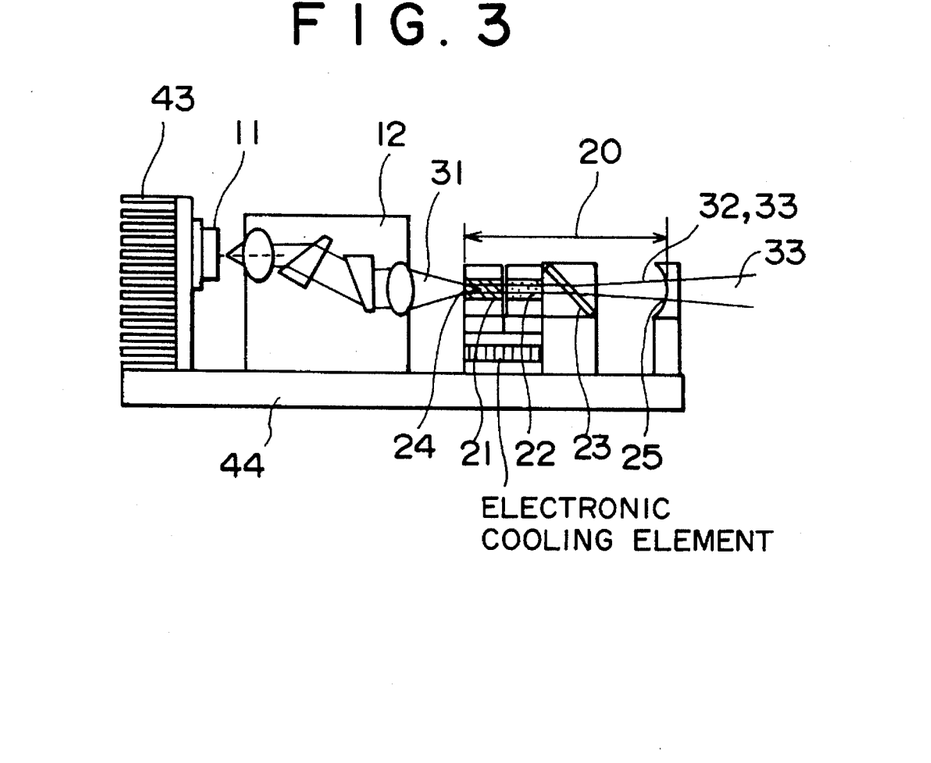
FIG. 3 is a diagram illustrative of an SHG laser which is still another embodiment of the present invention.

FIG. 3 is the diagram illustrative of the SHG laser which is another embodiment of the present invention. This embodiment employed the same exciting optical system, which includes the semiconductor laser 11, as that of the example 1.

The excited laser crystal 21 generates the fundamental wave 32, which is the oscillation wave of the solid-state laser, through the solid-state laser resonator 20 comprised of the resonator mirror 24 on the incident side which is formed on an end surface of the laser crystal and the output mirror 25. Disposed in the solid-state laser resonator 20 are the laser crystal 21, a nonlinear optical crystal 22 for converting a part of the fundamental wave into SHG wave, and the wavelength tuning element 23. For the nonlinear optical crystal 22, lithium triborate ($LiB_3O_5$: hereinafter referred to as "LBO") was used. The nonlinear optical crystal 22 was 3×3×5 mm large so that it may have 5 times larger than 0.25–0.3 beam diameter. It was provided with AR coating which provides 2% of reflectivity or less against the wavelengths of the fundamental wave and the SHG wave. Both the LiSAF crystal 21 and the LBO crystal 22 were set at 25°±0.1° C. by the temperature control element. The output mirror 25 was provided with HR coating of 99% of reflectivity or more with respect to the fundamental wave and with AR coating against the SHG wave, the aperture having a 10 mm of diameter which is the same as that in the example 1. For the other optical components, the same ones as those of the example 1 were employed. The wavelength of the fundamental wave 32 produced by the oscillation which takes place in the resonator was tuned using the wavelength tuning element 23 to enable the nonlinear optical crystal 22 to provide maximum wavelength converting efficiency. A part of the fundamental wave 32 is converted to the SHG wave 33 through the nonlinear optical crystal 22 before it is emitted through the output mirror 25. According to the present invention, an SHG output of 10 mW was obtained from a semiconductor laser input of 455 mW.

The wavelength tuning range was set to approximately 860±70 nm and wavelength selecting width was set to approximately 0.5 nm. The wavelength tuning range may be set around the wavelength which maximizes the converting efficiency of the LBO crystal; and the wavelength selecting width may be set at any value as long as it does not cause a marked drop in the SHG laser output.

As an alternative of the LBO crystal 22, one of barium borate ($\beta$-$BaB_2O_4$), potassium niobate ($KNbO_3$), lithium-potassium niobate (K-Li-Nb-O), lithium folate ($LiIO_3$), and other non-linear optical crystal which function as wavelength converting elements capable of phase matching in the wavelength tuning range of the fundamental wave.

The characteristics of the embodiment were compared with those of the conventional gas laser which provides the equivalent output as the embodiment. In terms of service life, the output of the gas laser dropped to 50% in 2000 to 5000 hours, while no drop in the output was observed with the SHG laser even after it was operated for more than 10000 hours. This means that the embodiment has extended the service life by two to five times. Further, in terms of size, the gas laser ranged from 10 to 15 liters, while the SHG laser was only 0.3 liter, indicating that the laser size has been reduced to 1/50 to 1/30 according to the embodiment. In terms of power consumption, the gas laser consumed 1000 to 2000 W, while the SHG laser consumed only 5 W, indicating that the power consumption has been reduced to 1/400 to 1/200 according to the embodiment. The results of comparison of the characteristics of the gas laser and the SHG laser which is the embodiment are shown in Table 1 below.

Table 1 Comparison in Performance of Gas Laser and SHG Laser According to the Invention

| Laser Light Source | Output (mW) | Life (hrs.) | Size (liters) | Power (W) |
| --- | --- | --- | --- | --- |
| Ar laser | 15 | 5000 | 10 | 2000 |
| He-Cd laser | 10 | 2000 | 15 | 1000 |
| SHG laser | 10 | >10000 | 0.3 | 5 |

This SHG laser can be used for laser application such as; laser printer, particle counter, optical inspection for medical use, photofabrication apparatus, and optical disk apparatus.

[EXAMPLE 4]

Figure 4:
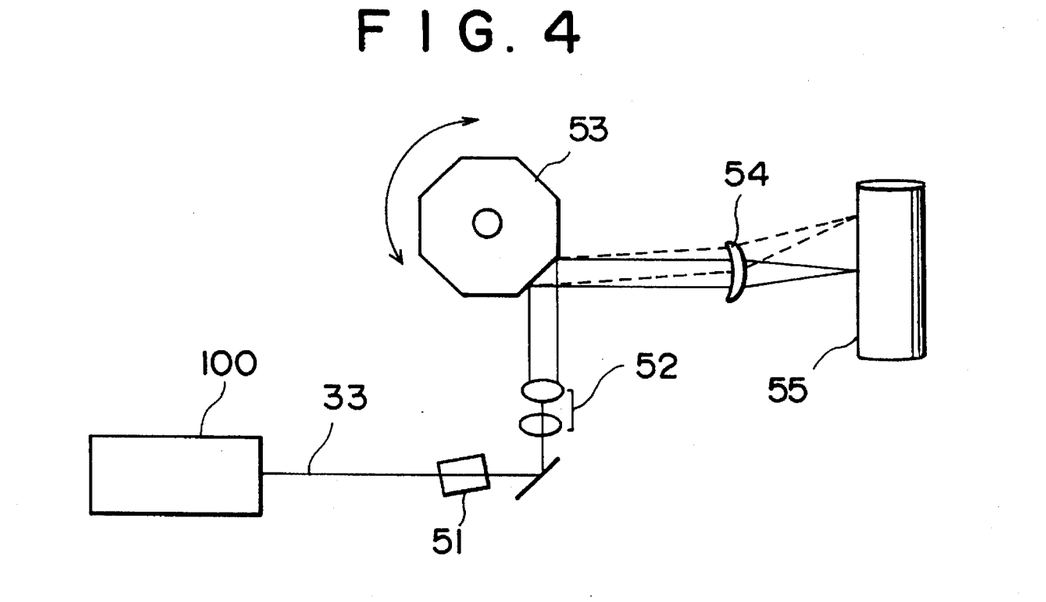
FIG. 4 is a diagram illustrative of an application example wherein an embodiment of the present invention is applied to a laser printer.

FIG. 4 is the diagram illustrative of the application example wherein an embodiment of the present invention is applied to a laser printer. The SHG laser output 33 issued from an SHG laser light source 100 which was described in relation to FIG. 3 passes through an acousto-optical (hereinafter referred to simply as "AO") modulator 51, beam expander 52, a rotary polygon mirror 53, and an f8 lens 54 to be converged onto a photosensitive drum 55. The AO modulator 51 modulates an SHG output 43 in accordance with image information; the rotary polygon mirror 53 scans in the horizontal direction (within the paper surface). This causes two-dimensional information to be recorded on the photosensitive drum 55 in the form of a partial potential difference. The photosensitive drum 55 rotates while applying toner in accordance with the aforesaid potential difference so as to reproduce the information on recording paper.

The photosensitive material applied onto the photosensitive drum 55 is selenium (Se). The output wavelength of the SHG laser light source 100 was set to 420 nm at which the photosensitive material displays a relatively high sensitivity; the output was set to 10 mW. Other photosensitive material than Se may be used.

[EXAMPLE 5]

Figure 5:
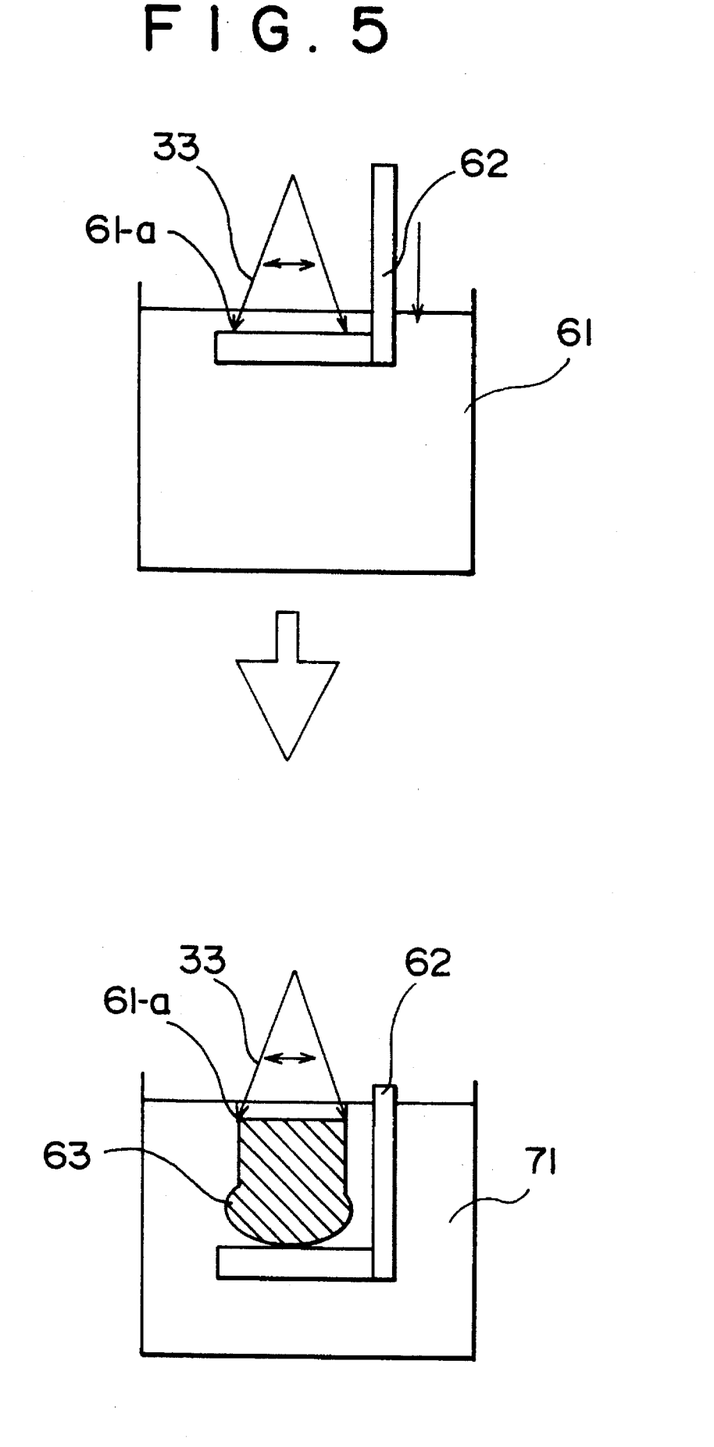
FIG. 5 is a diagram illustrative of an application example wherein an embodiment of the present invention is applied to a photofabrication apparatus.

FIG. 5 is the diagram illustrative of the application example wherein an embodiment of the present invention is applied to a photofabrication apparatus. The SHG laser light source 100 explained with reference to FIG. 3 was employed as the light source. A container was filled with blue hardening resin 61 and the liquid surface is scanned in a two-dimensional manner with a laser beam. This causes the blue hardening resin 61 to harden only in a liquid surface portion 61-a which has absorbed the light. After completion of the formation of one layer, an elevator 62 comes down to produce the next layer in succession. This series of operations created a three-dimensional model 63 in a desired shape. The SHG laser light source for this purpose was set for a wavelength of 430 nm and an output of 10 mW.

[EXAMPLE 6]

Figure 6:
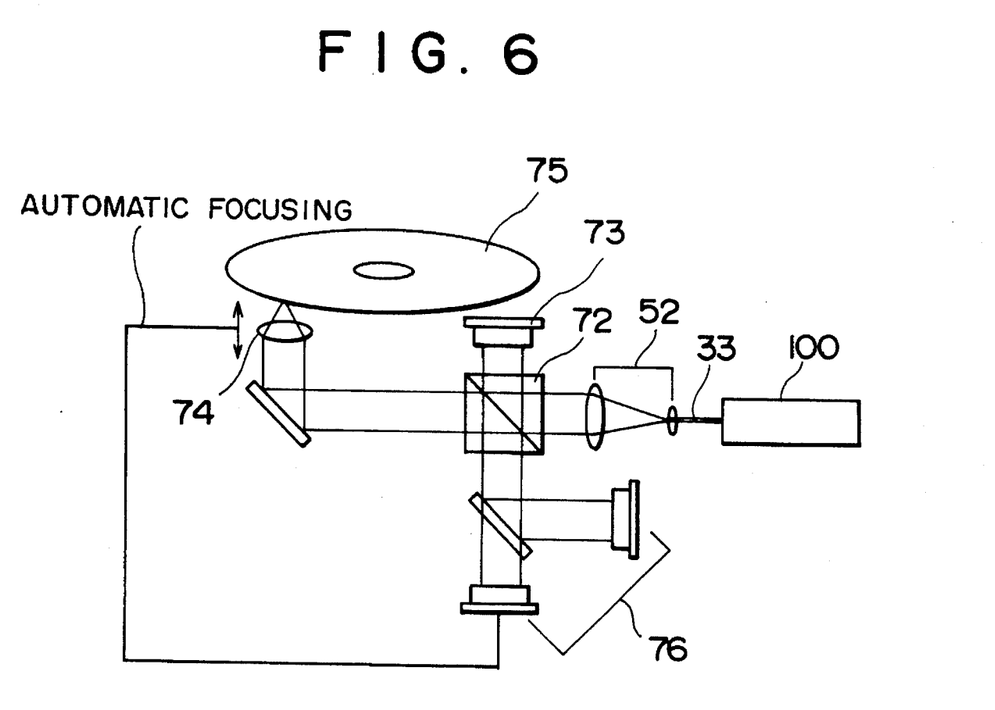
FIG. 6 is a diagram illustrative of an application example wherein an embodiment of the present invention is applied to an optical disk apparatus.

FIG. 6 is the diagram illustrative of an application example wherein an embodiment of the present invention is applied to an optical disk apparatus. As the light source, the SHG laser light source 100 mentioned with reference to FIG. 3 was employed. The optical disk apparatus employed the magneto-optical recording method. The SHG laser output 33 issued from the SHG laser light source 100 is expanded through the beam expander 52 and it becomes a parallel beam. The beam which is partially reflected by a beam splitter 72 is captured by a front monitor 73. The beam which has passed through the beam splitter 72 is converged onto a medium 75 through a condenser optical system 74, while the reflected light is partially reflected by the beam splitter 72 before it is split into two beams which are captures by two detectors 76. The front monitor 73 monitors the SHG laser output 33 to control the SHG laser output 33. The two detectors 76 which follow the beam splitter 72 perform automatic focusing and signal detection.

The medium 75, which has a predetermined magnetic field printed on, modulated the SHG laser output 33 to increase the focus temperature until Curie temperature of the medium 75 was reached so as to reverse the magnetization, thereby accomplishing the recording. More specifically, the magnetic field of the medium is reversed when the output is ON; the magnetic field is not reversed when the output is OFF, thus enabling a signal to be recorded. The recording frequency was set to 10 MHz. The same SHG laser light source 100 as that used for recording was employed for reproducing the signal with a successful result.

The efficiency of the LiSAF laser excited by semiconductor laser has significantly been improved by designing the resonator of the LiSAF laser with careful consideration given to the aperture in the resonator in accordance with the present invention. In addition, a means has been proposed for achieving stable laser output by controlling the temperature of the LiSAF crystal so as to avoid the decay of oscillation in the laser. The SHG laser capable of providing 10 mW-class output has been achieved by adopting the LiSAF laser. According to the present invention, marked improvements have been accomplished in the service life which has been extended by two to five times, in the size which has been reduced to 1/50 to 1/30, and the power consumption which has been reduced to 1/400 to 1/200. Furthermore, smaller size, low power consumption, prolonged service life, and higher reliability have been attained.

The preferred embodiments described herein are illustrative and not restrictive, the scope of the invention being indicated by the appended claims and all modifications which come within the meaning of the claims are intended to be embraced therein.

We claim:

1. A laser apparatus comprising:
   a resonator including a laser crystal composed of a fluoride which contains chromium and at least one laser beam manipulating optical component; and
   an exciter for exciting said laser crystal so as to emit therefrom a laser beam that is directed through said optical component,
   said laser beam manipulating optical component having an aperture which has a diameter that is at least five times as large as the diameter of the laser beam which is directed therethrough.

2. A laser apparatus according to claim 1, wherein said laser crystal is composed of $Cr:LiSrAlF_6$.

3. A laser apparatus according to claim 1, further comprising a temperature controller for said laser crystal.

4. A laser apparatus according to claim 1,, wherein said resonator includes a mirror formed on an end surface of said laser crystal.

5. A laser apparatus according to claim 1, wherein said optical component comprises a wavelength tuning element.

6. A laser apparatus according to claim 1, wherein said exciter comprises a semiconductor laser.

7. A laser apparatus according to claim 1, wherein said resonator includes at least two of said laser beam manipulating optical components, one of said components comprising a wavelength tuning element and another of said components comprising a nonlinear optical crystal.

8. A laser apparatus according to claim 7, wherein at least a part of said laser beam passes through said nonlinear optical crystal so as to be converted into a second laser beam having a different wavelength.

9. A laser apparatus according to claim 8, wherein said nonlinear optical crystal is one of lithium triborate, barium borate, potassium niobate, lithium-potassium niobate, and lithium iodate.

10. A laser apparatus according to claim 7, further comprising a temperature controller system for controlling temperatures of said laser crystal and said nonlinear optical crystal at the same time or independently.

11. A laser apparatus comprising:
    a resonator structure including a laser crystal made of $Cr:LiSrAlF_6$, at least one resonator mirror formed on an end surface of said laser crystal, and a wavelength tuning element; and
    a semiconductor laser for exciting said laser crystal so as to emit therefrom a laser beam that is oscillated in said resonator structure and directed through said tuning element, said beam having a wavelength $\lambda_1$, wherein $780 \leq \lambda_1 \leq 1000$ nm,
    said wavelength tuning element having an aperture which has a diameter that is at least five times as large as the diameter of said laser beam.

12. A laser apparatus according to claim 11, further comprising a temperature controller for said laser crystal.

13. A laser apparatus according to claim 12, wherein said temperature controller controls a temperature of said laser crystal within a range over which input/output characteristics are not saturated.

14. A laser apparatus according to claim 12, wherein said temperature controller controls a temperature T of said laser crystal within a range of $0 \leq T \leq 50°$ C.

15. A laser-applied apparatus which includes a laser apparatus comprising:
    a resonator including a laser crystal composed of a fluoride which contains chromium and at least one laser beam manipulating optical component; and
    an exciter for exciting said laser crystal so as to emit a laser beam therefrom that is directed through said optical component,
    said laser beam manipulating optical component having an aperture which has a diameter that is at least five times as large as the diameter of the laser beam which is directed therethrough.

16. A laser-applied apparatus according to claim 15, wherein said laser-applied apparatus comprises a laser printer.

17. A laser-applied apparatus according to claim 15, wherein said laser-applied apparatus comprises a photofabrication apparatus.

18. A laser-applied apparatus according to claim 15, wherein said laser-applied apparatus comprises an optical disk apparatus.

19. A method of operating a laser comprising:

exciting a laser crystal composed of a fluoride which contains chromium, whereby to cause a laser beam to be emitted from said laser crystal;

oscillating said laser beam in a resonator which includes said laser crystal and at least one laser beam manipulating optical component, said optical component having an aperture which has a diameter that is at least five times as large as the diameter of said laser beam; and directing said oscillating laser beam through said aperture.

* * * * *